United States Patent
Walton et al.

(10) Patent No.: US 12,103,384 B2
(45) Date of Patent: Oct. 1, 2024

(54) SYSTEM AND METHOD FOR A VEHICLE ACCELERATOR PEDAL

(71) Applicant: FORD GLOBAL TECHNOLOGIES, LLC, Dearborn, MI (US)

(72) Inventors: Matthew Walton, Lathrup Village, MI (US); Douglas Raymond Martin, Canton, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 442 days.

(21) Appl. No.: 17/465,937

(22) Filed: Sep. 3, 2021

(65) Prior Publication Data

US 2023/0072963 A1  Mar. 9, 2023

(51) Int. Cl.
*B60K 26/02* (2006.01)
*G05G 5/04* (2006.01)
*G05G 5/05* (2006.01)

(52) U.S. Cl.
CPC ............... *B60K 26/02* (2013.01); *G05G 5/04* (2013.01); *G05G 5/05* (2013.01); *B60Y 2400/418* (2013.01); *G05G 2505/00* (2013.01)

(58) Field of Classification Search
CPC . B60K 26/02; G05G 5/04; G05G 5/05; G05G 2505/00; B60Y 2400/418
USPC .......................................................... 701/99
See application file for complete search history.

(56) References Cited

U.S. PATENT DOCUMENTS

| | | | |
|---|---|---|---|
| 5,570,613 A * | 11/1996 | Spradlin | G05G 1/30 74/513 |
| 5,730,238 A * | 3/1998 | Tamaki | B60L 3/04 701/22 |
| 6,487,477 B1 | 11/2002 | Woestman et al. | |
| 7,996,137 B2 * | 8/2011 | Groitzsch | B60T 7/12 180/170 |
| 8,001,870 B2 * | 8/2011 | Saito | G05G 1/38 74/513 |
| 10,081,360 B2 | 9/2018 | Hu et al. | |
| 10,507,831 B2 | 12/2019 | Haupts | |
| 11,343,994 B1 * | 5/2022 | Owen | A01H 6/542 |
| 2002/0029914 A1 * | 3/2002 | Schmidt | B60T 8/48 180/170 |
| 2005/0167175 A1 | 8/2005 | Isaji et al. | |
| 2018/0194351 A1 * | 7/2018 | Haupts | B60K 31/00 |
| 2019/0232950 A1 | 8/2019 | Atluri et al. | |

(Continued)

FOREIGN PATENT DOCUMENTS

EP  1481836 A1 * 12/2004  ........... B60K 26/021
WO  2006040916 A1  4/2006

*Primary Examiner* — Yonel Beaulieu
*Assistant Examiner* — Jean W Charleston
(74) *Attorney, Agent, or Firm* — Vincent Mastrogiacomo; Brooks Kushman P.C.

(57) ABSTRACT

A vehicle, an accelerator pedal system, and a method of controlling the vehicle are provided. The accelerator pedal system has an accelerator pedal, a pedal limit connected to a motor and movable towards and away from the accelerator pedal, wherein the pedal limit limits movement of the accelerator pedal in a first direction when the pedal limit is in contact with the accelerator pedal, and a controller configured to control the motor to move the pedal limit to a first position in contact with the accelerator pedal in response to receiving a cruise control input from a driver to maintain a selected vehicle speed without actuation of the accelerator pedal.

20 Claims, 6 Drawing Sheets

(56) References Cited

U.S. PATENT DOCUMENTS

2020/0369286 A1\* 11/2020 Zhang .................. B60W 40/105
2021/0031781 A1\* 2/2021 Sasaki .................. B60W 30/188

\* cited by examiner

SYSTEM AND METHOD FOR A VEHICLE ACCELERATOR PEDAL

TECHNICAL FIELD

The present disclosure relates to systems and methods for use with a vehicle and its accelerator pedal.

BACKGROUND

Vehicles equipped with a cruise control mode give the driver the ability to maintain a desired speed of the vehicle, while removing driver input from an accelerator pedal. After removing driver input, e.g. from a foot, the accelerator pedal returns to an idle position. When a driver is requesting additional torque via the accelerator pedal while in cruise control, the accelerator pedal may traverse a zone between the idle position and the torque request zone known as the inactive zone, or also known as a dead or unresponsive zone. The distance of the inactive zone may be unknown by the driver. Vacuum-based cruise control systems incidentally provide resistance feedback to a driver indicating the inactive zone has been cleared. However, a vehicle having electric throttle may not provide resistance feedback to the driver.

SUMMARY

According to an embodiment, a vehicle has a chassis, a prime mover, an accelerator pedal, a pedal limit, and a controller. The prime mover is supported by the chassis. The prime mover is configured to propel the vehicle. The accelerator pedal is supported by the chassis. The accelerator pedal moves in a first direction to request additional torque from the prime mover. The pedal limit is connected to a motor. The pedal limit is movable towards and away from the accelerator pedal. The pedal limit limits movement of the accelerator pedal in the first direction when the pedal limit is in contact with the accelerator pedal. The controller is configured to control the motor to move the pedal limit to contact the accelerator pedal in response to receiving an input from the driver to maintain a selected vehicle speed without actuation of the accelerator pedal.

According to another embodiment, a method of controlling a vehicle is provided. The method includes receiving a request from a driver to operate a vehicle in cruise control at a selected vehicle speed. The propulsion method continues by controlling a prime mover to propel the vehicle at the selected vehicle speed without actuation of an accelerator pedal. Further the propulsion method includes actuating a pedal limit towards the accelerator pedal to maintain the accelerator pedal in a position associated with the selected vehicle speed and limit movement of the accelerator pedal towards an idle position while the vehicle is operating in cruise control.

According to an embodiment, an accelerator pedal system for a vehicle has an accelerator pedal, a spring, a pedal limit, and a controller. The accelerator pedal is movable in a first direction to request additional torque from a prime mover. The spring is configured to bias the accelerator pedal in a second direction opposite to the first direction. The pedal limit limits movement of the accelerator pedal in the first direction when the pedal limit is in contact with the accelerator pedal. The controller is configured to control the motor to move the pedal limit to a limit a first position in contact with the accelerator pedal in response to receiving a cruise control input from the driver to maintain a selected vehicle speed without actuation of the accelerator pedal.

DETAILED DESCRIPTION

As required, detailed embodiments of the present disclosure are provided herein; however, it is to be understood that the disclosed embodiments are merely examples and may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present disclosure.

Figure 1:
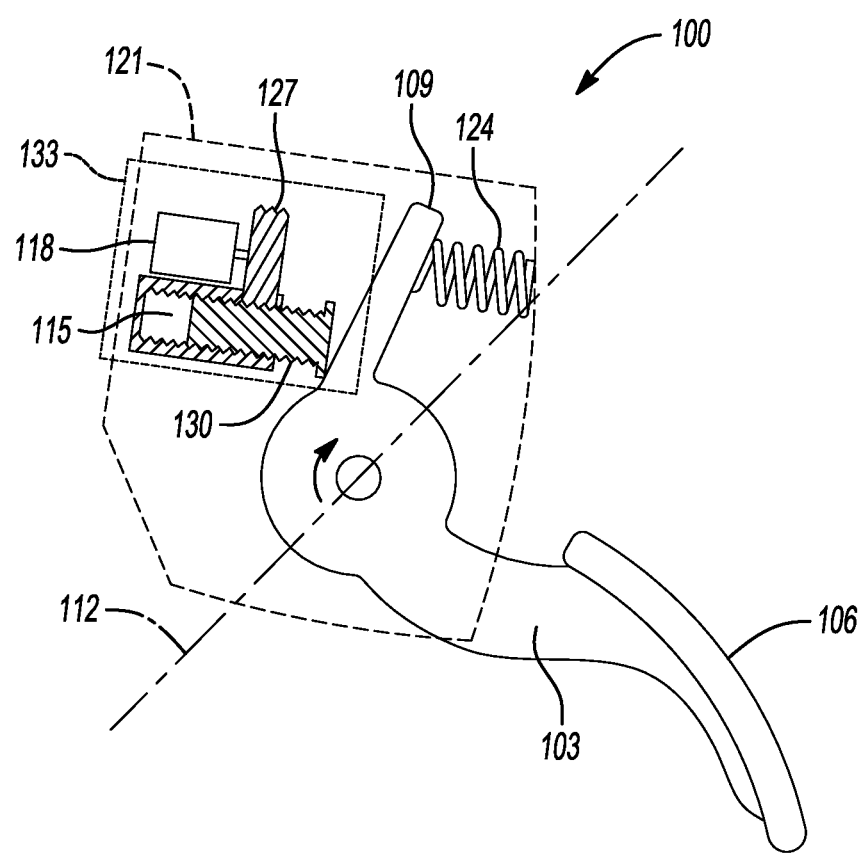
FIG. 1 illustrates a schematic of an accelerator pedal system according to an embodiment.

FIG. 1 illustrates a schematic of an accelerator pedal assembly 100. The accelerator pedal assembly 100 has an accelerator pedal 103. The accelerator pedal 103 is configured to receive input from driver. The input may receive from the driver by one of depression and release of the pedal from the driver, e.g. by receiving a force from the driver's foot. In some embodiments, depression, or movement of the accelerator pedal 103 in a first direction, may be indicative of a forward or positive torque request for the vehicle, or to request additional torque from a vehicle prime mover as described below. Additionally, or alternatively, the release of the accelerator pedal assembly 100 may be indicative of reverse torque request. Further, release of the accelerator pedal assembly 100 may be indicative of braking torque. When released, the accelerator pedal 103 may move in a second direction opposite to the first direction. The accelerator pedal 103 may be configured to travel between a first position indicative of idle throttle, and a second position indicative of wide-open throttle. As the accelerator pedal moves between the first and second positions, the throttle position and torque request vary, and the pedal position may correspond to a throttle position or torque request based on a map or the like as described below. The pedal position may further be associated with a drivetrain torque required to meet the desired or selected vehicle speed.

In the example shown, the accelerator pedal 103 has a proximal end 106 and a distal end 109. The proximal end 106 is configured to receive input of a physical force from a driver. The distal end 109 is spaced apart from and may be angularly disposed apart from the proximal end 106. The distal end 109 may be configured to receive a limiting force and a biasing force according to the present disclosure. The biasing force may act to actuate or move the accelerator pedal assembly 100 in a direction opposite of a force input from a driver, or in the second direction towards the first position. The accelerator pedal assembly 100 defines a rotational axis 112. Both the distal end 109 and proximal end 106 are disposed radially outward from the rotational axis 112 and rotate relative to the rotational axis 112. The distal end 109 and the proximal end 106 may be connected such that they rotate together about the axis 112. As such, the biasing force and driver input may act against each other regarding actuating the pedal.

The accelerator pedal assembly 100 may have a biasing member such as a return spring 124. The return spring 124 may be disposed between the accelerator pedal 103 and a vehicle chassis or other support structure. The return spring 124 may apply a biasing force upon the accelerator pedal 103, biasing the accelerator pedal 103 in the second direction and towards the first position.

The accelerator pedal assembly 100 has a limit assembly 133. The limit assembly 133 includes a pedal limit 115 and a limit motor 118. The limit motor 118 may be an electric motor with a rotating output shaft, or alternatively, may be a linear or other actuator. The limit motor 118 is configured to receive input from a vehicle controller, and as described below. Upon receiving a signal indicative of an actuation request, the limit motor 118 is activated and controlled to move the limit 115 to a selected position. The limit motor 118 may move the pedal limit 115 towards and away from the accelerator pedal 103. In some embodiments, activation of the limit motor 118 may include rotational actuation of an output shaft. In this embodiment, the pedal limit 115 defines a worm or worm shaft 130, and the limit motor 118 defines a worm gear 127. The worm gear 127 drives the worm shaft to translate the pedal limit 115. The worm gear 127 and worm shaft 130 are in meshed engagement, such that rotation of the worm gear 127 induces rotation of the worm shaft 130, and translation of the pedal limit 115.

The pedal limit 115 is configured to inhibit movement of the accelerator pedal 103 in the first direction. To achieve actuation limiting, the pedal limit 115 may be configured to traverse to a plurality of positions within the range of the accelerator pedal positions. In at least one of the plurality of positions, movement of the accelerator pedal 103 is restricted due to the accelerator pedal 103 abutting the pedal limit 115. In at least one position, the accelerator pedal 103 may not be restricted by the pedal limit 115. The pedal limit 115 may be configured to restrict actuation of the accelerator pedal 103 in the first direction. In one non-limiting example, the pedal limit 115 is moved to a position at 50% travel between the first and second positions of the accelerator pedal 103. The accelerator pedal 103 may move from the 50% travel location towards the second position, and is restricted or inhibited from moving from the 50% travel location back to the first position by the pedal limit 115 until the pedal limit 115 is moved or retracted. The biasing member continues to exert a biasing force on the pedal 103 such that the pedal 103 engages or contacts the pedal limit 115 when it is deployed.

Figure 2:
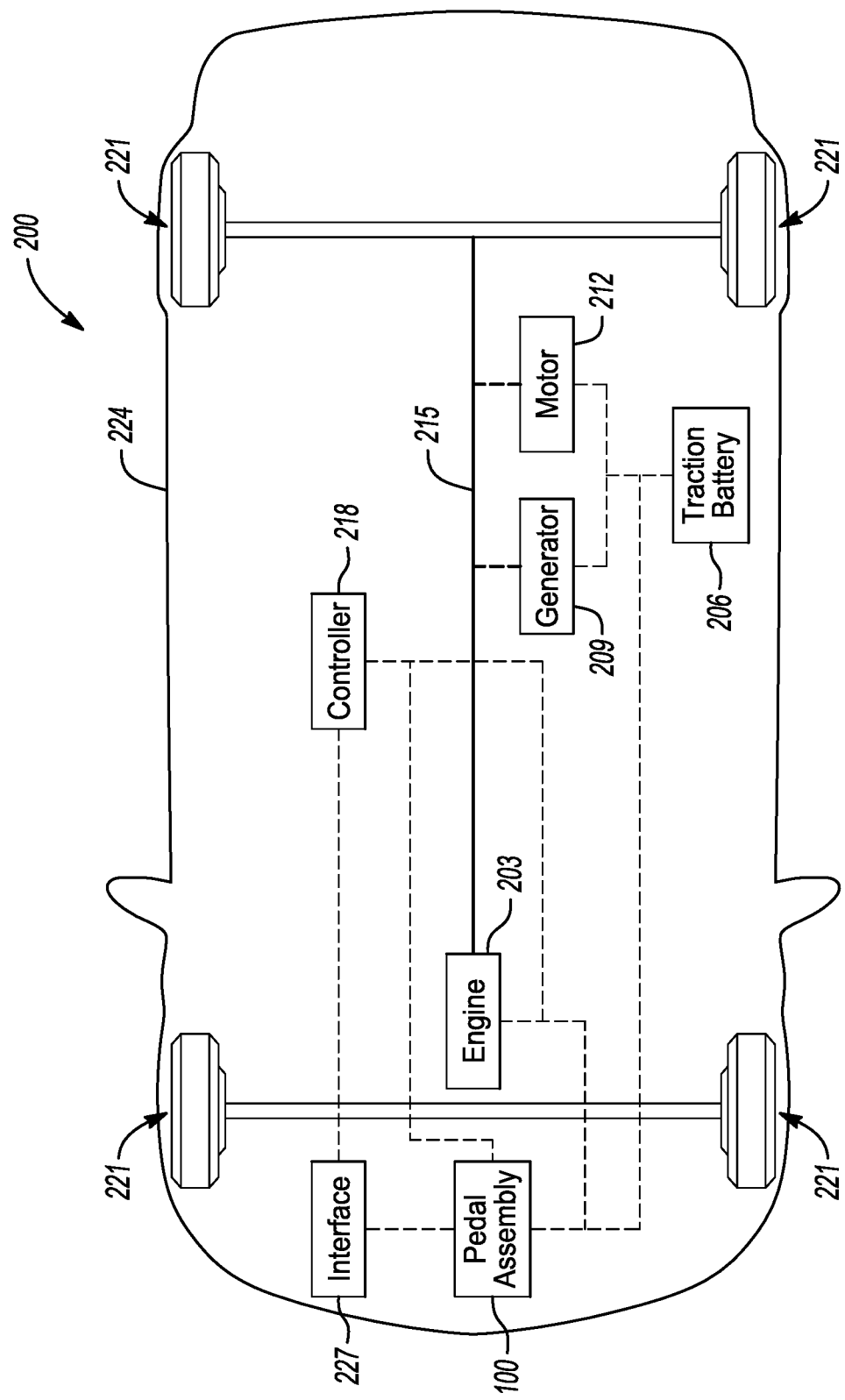
FIG. 2 illustrates a schematic of a vehicle for use with the accelerator pedal system of FIG. 1 and according to an embodiment.

FIG. 2 illustrates a vehicle 200. The vehicle 200 has a drivetrain 215. The drivetrain 215 rotatably couples the prime mover(s) of the vehicle to the plurality of wheels 221. The drivetrain 215 may include a transmission, as well as other torque transfer devices. The vehicle 200 has a prime mover 203. The prime mover 203 is used to output and provide torque to a plurality of wheels 221 via a drivetrain 215. In one example, the prime mover 203 is an internal combustion engine. In other embodiments, the prime mover 203 may be a diesel engine. In further examples, the prime movers may alternatively or additionally include one or more electric machines such that the vehicle is a hybrid vehicle or battery electric vehicle.

The vehicle 200 has a vehicle battery 206. The vehicle battery 206 is used to store electrical energy. Further, the vehicle battery 206 may be used to convert the stored electrical energy into mechanical energy to propel the vehicle 200 for a hybrid or battery electric vehicle.

The vehicle 200 includes the accelerator pedal assembly 100. The accelerator pedal assembly 100 is in communication with the prime movers 203 via the controller 218. Driver input to the accelerator pedal assembly 100, and the location of the pedal 103 relative to the first and second positions for the pedal 103, may instruct the prime mover 203 to provide more or less torque to the vehicle 200 via the controller 218.

The vehicle 200 has a vehicle chassis 224. The vehicle chassis 224 defines a vehicle interior. The vehicle chassis 224 is configured to at least partially support the accelerator pedal 103 of the accelerator pedal assembly 100.

Various components of the vehicle 200, including the prime mover 203, the vehicle battery 206, and the accelerator pedal assembly 100 are in communication with a controller 218 or control system. The controller 218 may be provided as one or more controllers or control modules for the various vehicle components and systems. The controller 218 and control system for the vehicle may include any number of controllers, and may be integrated into a single controller, or have various modules. Some or all of the controllers may be connected by a controller area network (CAN) or other system. It is recognized that any controller, circuit or other electrical device disclosed herein may include any number of microprocessors, integrated circuits, memory devices (e.g., FLASH, random access memory (RAM), read only memory (ROM), electrically programmable read only memory (EPROM), electrically erasable programmable read only memory (EEPROM), or other suitable variants thereof) and software which co-act with one another to perform operation(s) disclosed herein. In addition, any one or more of the electrical devices as disclosed herein may be configured to execute a computer-program that is embodied in a non-transitory computer readable medium that is programmed to perform any number of the functions as disclosed herein.

The vehicle 200 has a control interface 227. The control interface 227 is configured to allow the driver to communicate with the controller 218. In some embodiments, the control interface 227 is a vehicle dashboard. In other embodiments, the control interface 227 is one of an infotainment system and an interactive steering wheel.

The controller 218 contains a cruise control method. The cruise control method allows the vehicle 200 to maintain a desired speed without input to the accelerator pedal 103. In at least one embodiment, a driver sets the desired speed by the vehicle to the desire speed and requesting the vehicle 200 be placed in cruise control using a cruise control input on a control interface. The cruise control input may be a button, switch, or other input in the vehicle interior. Commonly, the cruise control input is located on a control interface on the steering wheel for ease of access by the driver. The cruise control input may include a set function, a cancel function, a resume function, a speed increase function, and a speed decrease function. The cruise control input maybe executed with the control interface 227. In this embodiment, the controller accepts the speed of the vehicle 100 as the desired speed, for example, when the set function on the cruise control input is activated by the driver. In another embodiment, the controller receives input from the driver indicative of a desired speed via a control interface via the set function. The controller 218 is also configured to terminate the cruise control method via the cancel function. The controller 218 may be configured to terminate the cruise control method in response to driver input indicative of speed reduction, such as depression of a brake pedal. Additionally, or alternatively, the controller 218 may be configured to terminate the cruise control method in response to a vehicle component independently requesting termination of the method, such as adaptive cruise control or other advanced driver assistance systems (ADAS).

The controller 218 is configured to control actuation of the pedal limit 115. The controller 218 is configured to send signals indicative of activation to the limit motor 118. The signals may be indicative of the limit 115 position, speed, direction, and/or holding strength. In one embodiment, the controller 218 includes a speed-to-torque schedule for the vehicle. The speed-to-torque schedule also contains accelerator pedal positions corresponding to expected torque values. The speed-to-torque schedule may serve as an inverse lookup table. The speed-to-torque schedule is defined by vehicle speed value entries. The speed-to-torque schedule is configured to assign an expected torque value to each defined speed value. The controller 218 in configured to signal the limit assembly 133 to move about the accelerator pedal positions in correlation with expected torque values. In one example, the controller 218 determines the position of the limit 115 based on the pedal map that maps engine torque and/or traction motor torque with a pedal position. The pedal map may also be used to determine a desired pedal position associated with the desired or set engine and/or traction motor torque, for example, as an inverse-lookup from the pedal map.

The pedal limit 115 may be within a predetermined range of actual pedal position that would request torque. In such an embodiment, the accelerator pedal may be located in the inactive-zone, and the pedal limit is positioned adjacent to but spaced apart from the accelerator pedal to limit the distance needed to travel by the accelerator pedal to request additional torque from the prime mover(s). In various embodiments, the predetermined range may be 10% of the total pedal travel, 5% of the total pedal travel, or 2% of the total pedal travel. For example, if the angle that the accelerator pedal needed to travel through to request additional torque is 100 degrees from the idle position, the controller 218 may actuate the pedal limit 115 to locate the accelerator pedal at 98 degrees from the idle position to reduce the inactive zone travel from 100 degrees to only 2 degrees.

Figure 3:
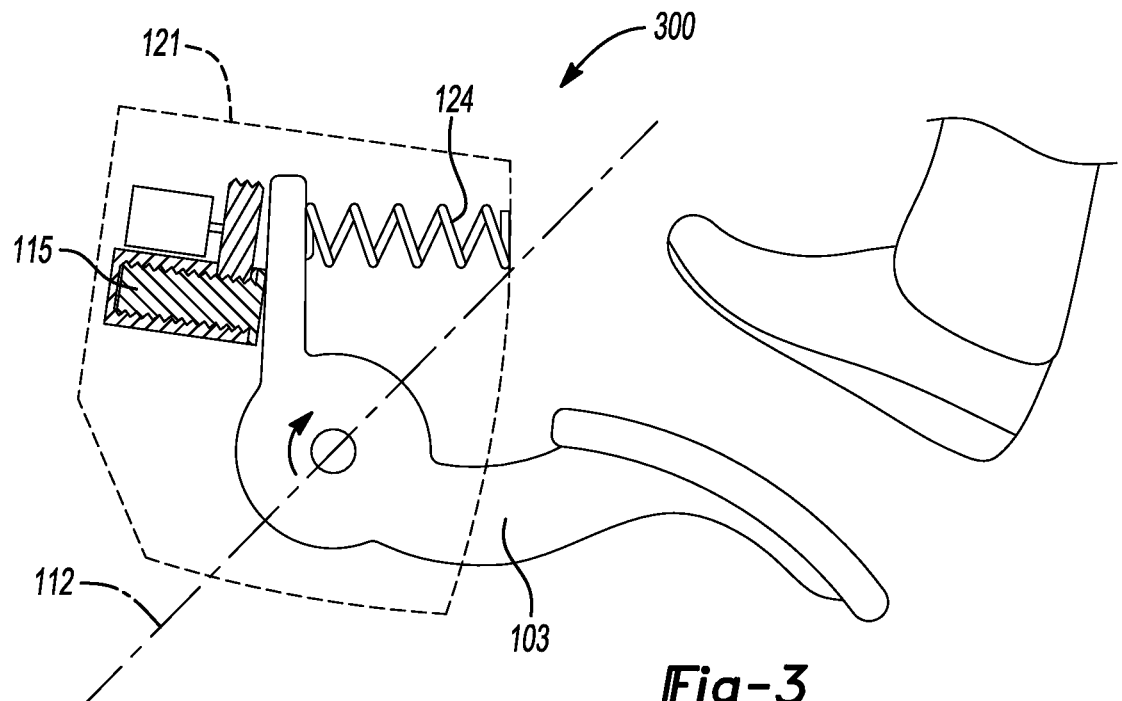
FIG. 3 illustrates a first configuration of an accelerator pedal assembly according to an embodiment.

FIG. 3 illustrates a first configuration 300 of the accelerator pedal assembly 100. The first configuration 300 represents a configuration in which a driver is not pressing the accelerator pedal 103 to request torque from the prime mover 203, as well as the driver has not requested the vehicle to be placed in cruise control mode. In the first configuration 300, the accelerator pedal 103 is in the first position, or an idle position. As such, the pedal limit 115 is in a retracted position. In the first configuration 300, the accelerator pedal 103 is not inhibited from returning to the idle position when activated or is not prevented from moving in a counterclockwise direction about the rotational axis 112 to return to the idle position. The return spring 124 is lower-compressed between the accelerator pedal 103 and the housing 121, and applies a smaller biasing force to the accelerator pedal 103 to bias the accelerator pedal 103 towards the first, idle position than if it were in a compressed state. While in the lower-compressed state, the return spring 124 may still apply a biasing on the accelerator pedal 103 toward the idle position.

Figure 4:
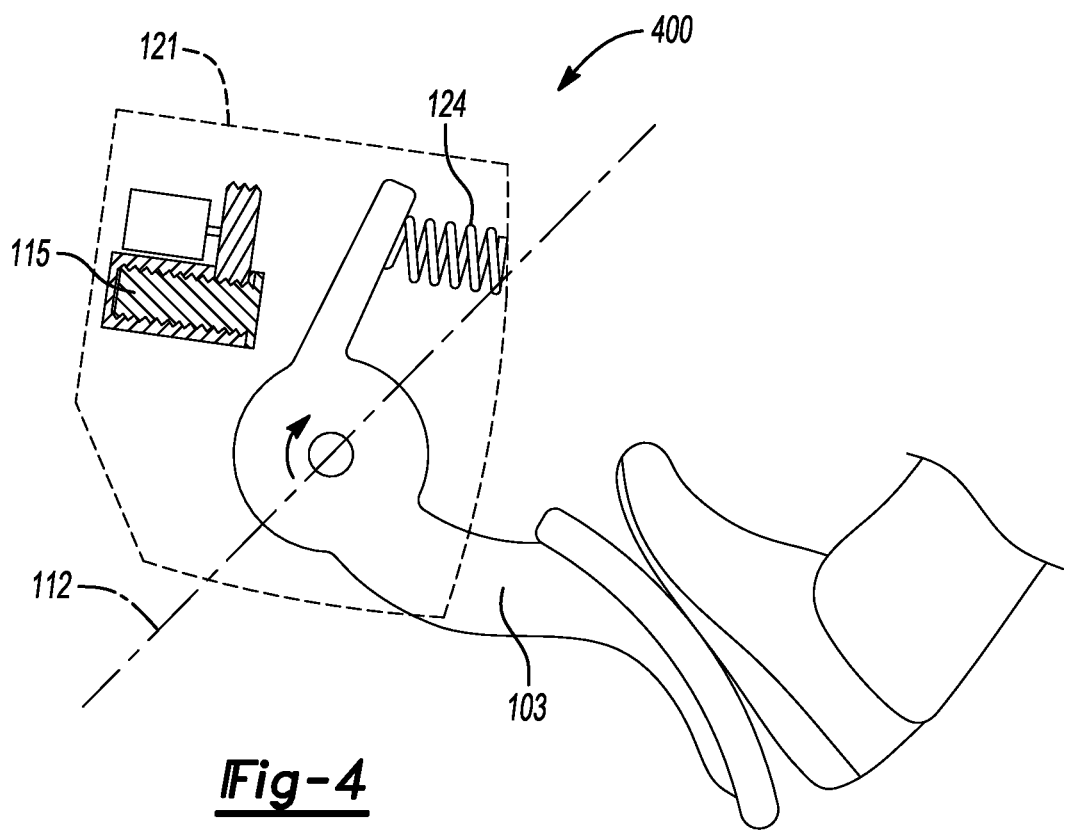
FIG. 4 illustrates a second configuration of the accelerator pedal assembly of FIG. 3.

FIG. 4 illustrates a second configuration 400 of the accelerator pedal assembly 100. The second configuration 400 represents a configuration in which a driver is pressing the accelerator pedal 103 to request torque from the prime mover 203. The cruise control is not activated as the driver has not requested the vehicle to be placed in cruise control mode. In the second configuration 400, the accelerator pedal 103 is in a torque request position and has been moved from the first position towards the second position. Still, the pedal limit 115 is in a retracted position and has not been actuated. As the return spring 124 is compressed between the accelerator pedal 103 and the housing 121, the return spring 124 applies a biasing force to the accelerator pedal 103 to bias the accelerator pedal 103 towards the first, idle position. This biasing force is counteracted by the force of the driver input. In the second configuration 400, the accelerator pedal 103 is not inhibited from moving in a counterclockwise direction about the rotational axis 112 to the idle position.

Figure 5:
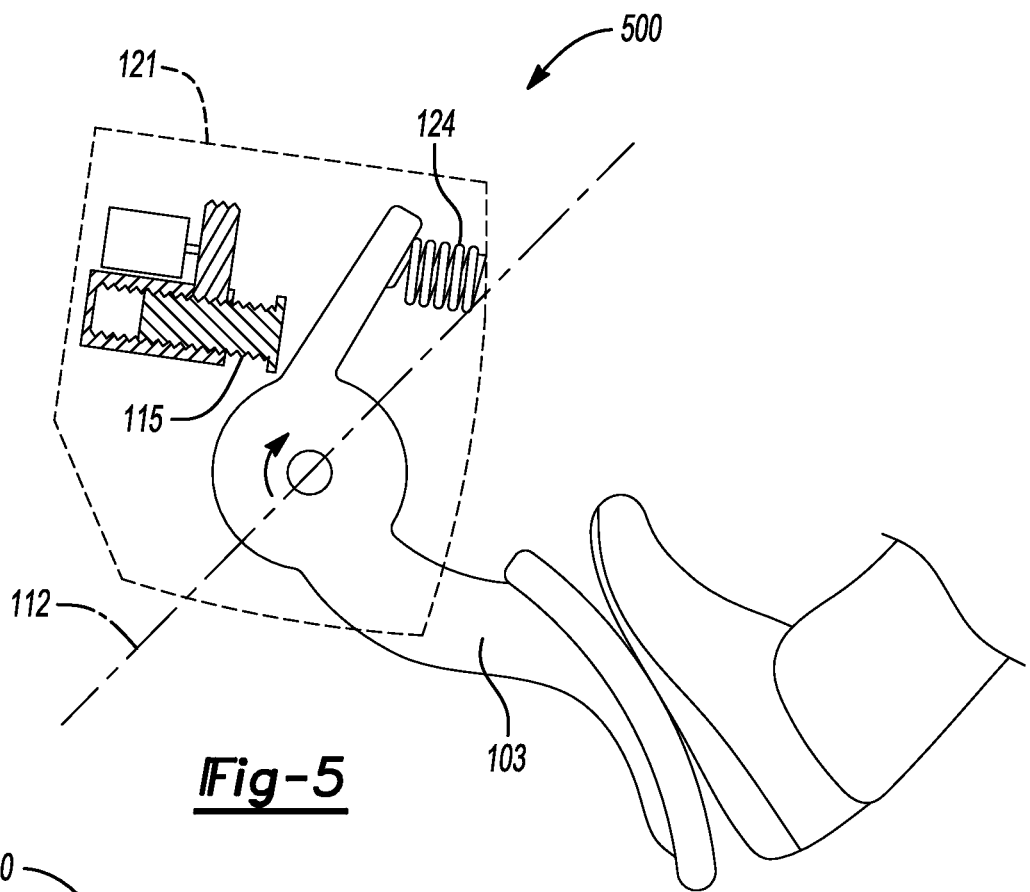
FIG. 5 illustrates a third configuration of the accelerator pedal assembly of FIG. 3.

FIG. 5 illustrates a third configuration 500 of the accelerator pedal assembly 100. The third configuration 500 represents a configuration in which the driver is pressing the accelerator pedal 103 to request torque from the prime mover 203 during or after requesting the vehicle to be placed in cruise control mode. In the third configuration 500, the accelerator pedal 103 is in a torque request position. The pedal limit 115 has been placed in an actuated position and moved in a direction towards the accelerator pedal. In the actuated position, the pedal limit 115 acts to inhibit the accelerator pedal 103 from moving in a counterclockwise direction about the rotational axis 112 from a position of the pedal limit to the idle position. Further, the limit motor 118 is configured to provide resistance torque to the pedal limit 115 to prevent the pedal limit 115 from returning to a retracted position. Additionally, the return spring 124 is compressed between the accelerator pedal 103 and the housing 121 and applies a biasing force to the accelerator pedal 103. This biasing force is counteracted by the force of the driver input. The accelerator pedal may move between the position associated with the pedal limit and the second position of the accelerator pedal in FIG. 5. For example, the driver may request additional torque and increased vehicle speed while the vehicle is operating in cruise control mode and with the pedal limit 115 actuated by inputting force to the accelerator pedal as shown in FIG. 5. As the pedal limit 115 is positioned at or near the pedal position for the selected cruise control speed, the accelerator pedal's travel through any inactive zone is reduced.

Figure 6:
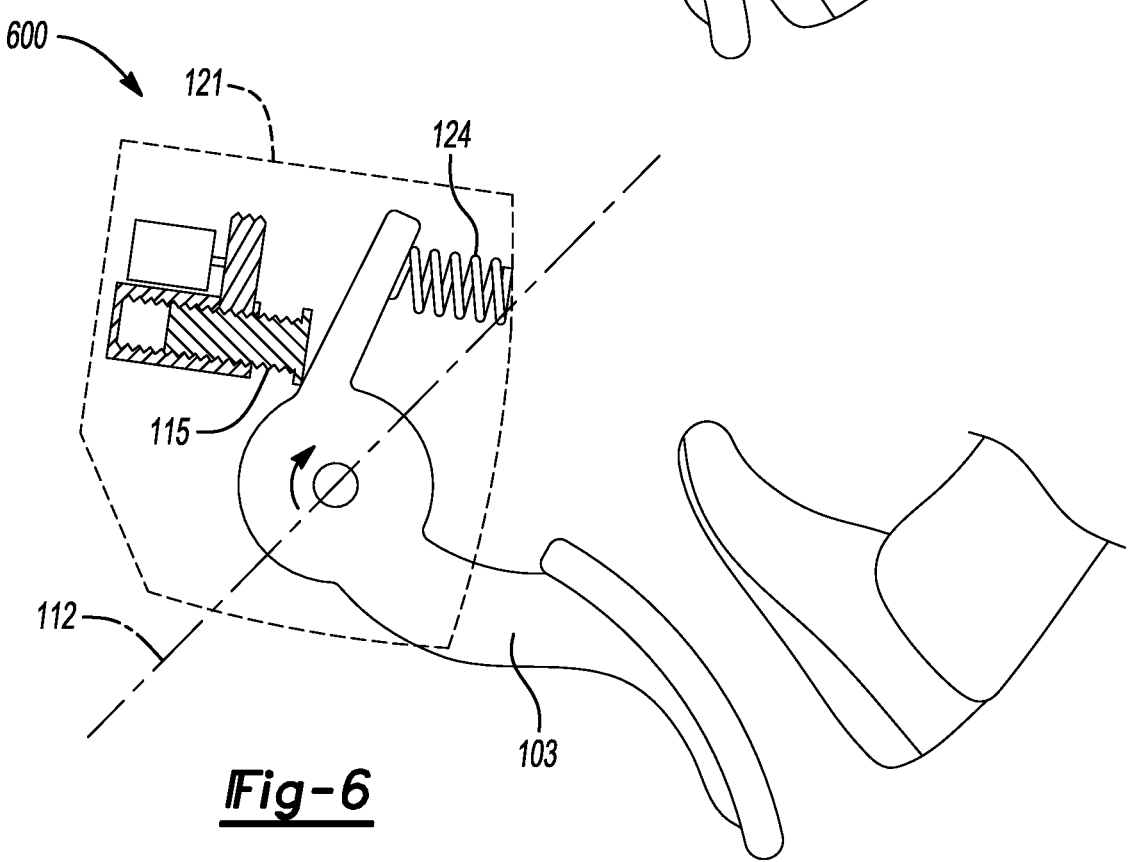
FIG. 6 illustrates a fourth configuration of an accelerator pedal assembly of FIG. 3.

FIG. 6 illustrates a fourth configuration 600. The fourth configuration 600 represents a configuration in which the driver is not pressing the accelerator pedal 103 to request torque from the prime mover 203, yet the driver has requested the vehicle to be placed in cruise control mode. In the fourth configuration 600, the accelerator pedal 103 is in a torque request position. The pedal limit 115 has been placed in an actuated position at a position based on the pedal map as described above. In the actuated position, the pedal limit 115 acts to inhibit the accelerator pedal 103 from moving in a counterclockwise direction about the rotational axis 112 to the idle position. The return spring 124 is compressed between the accelerator pedal 103 and the housing 121 and applies a biasing force to the accelerator pedal 103. The biasing force biases the accelerator pedal 103 towards the pedal limit 115 such that the accelerator pedal abuts the pedal limit. Thus, the biasing force is counteracted by the pedal limit 115. As the pedal limit 115 is positioned at or near the pedal position for the selected cruise control speed as described above, the accelerator pedal is positioned near the desired pedal position for the selected cruise control speed.

Figure 7:
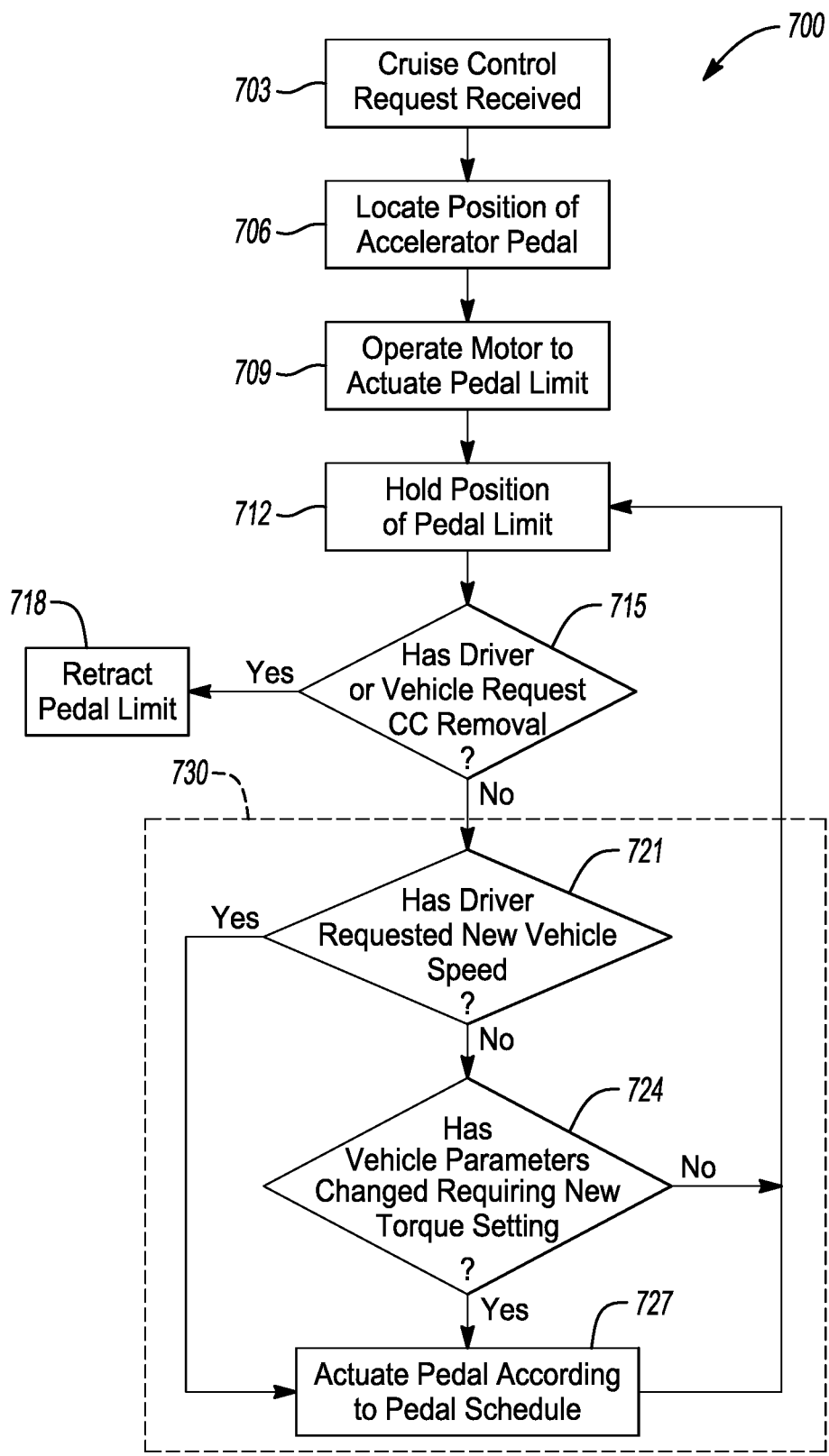
FIG. 7 illustrates a flow chart for a pedal limit control method according to an embodiment.

FIG. 7 depicts a flow chart for a pedal limit control method 700 for controlling an accelerator pedal system. In one example, the method may be used with the system of FIGS. 3-6. In a further example, the method may be used with the vehicle of FIG. 2.

The pedal limit control method 700 starts with a cruise control request step 703, in which the vehicle controller 218 receives a signal indicative that the driver of the vehicle 200 desires to start cruise control, e.g. via the control interface.

The pedal limit control method 700 moves to a pedal location acquisition step 706, in which the vehicle controller 218 determines a desired pedal position for the accelerator pedal 103 corresponding to a predetermined range of an additional torque position. In one embodiment, the controller will parse a speed-to-torque schedule to determine the pedal position. The controller may use a pedal map to determine the pedal position associated with the requested speed and torque from the cruise control.

Next, the pedal limit control method 700 moves to a motor revolution step 709, in which the pedal limit 115 is actuated to a limit position based on the desired pedal position. The position for the pedal limit may be set at a threshold value below the desired pedal position or at a threshold value below the torque request for the selected vehicle speed in cruise control. Following this, the pedal limit 115 is held in this position in the hold position step 712.

In the monitor cruise control step 715, the vehicle controller 218 will monitor if the driver or a vehicle component has requested termination of the cruise control method, e.g. via the control interface, a brake pedal input, or the like.

If termination of the cruise control method has been requested, the pedal limit control method 700 will move to a retract step 718, in which the vehicle controller 218 will send a signal to the accelerator pedal assembly 100 to retract the pedal limit 115 and move the pedal limit 115 away from the accelerator pedal and towards the retracted position.

If a driver or a vehicle component has not requested to terminate the cruise control, the pedal limit control method 700 will move to an update subroutine 730. The update subroutine 730 begins with a new speed request step 721, in which the accelerator pedal 103 and other vehicle components are monitored to detect a desired variation in the selected cruise control speed. For example, a driver may increase the speed of the vehicle 200 via the accelerator pedal 103 or other inputs on the control interface and set the cruise control to the new desired speed. Another example would be a driver inputting a signal indicative of a desired decrease in speed, such as pressing the brake. An even further example is components of the vehicle determining a non-driver dependent reason to decrease speed, such as with an adaptive cruise control system detecting a slowing vehicle ahead, maintaining a selected distance from another object outside the vehicle, and the like.

If the vehicle controller 218 detects a signal indicative of a desired cruise control speed change, the update subroutine 730 will move to the actuate pedal step 727, in which the vehicle controller 218 signals the accelerator pedal assembly 100 to adjust the position of the pedal limit 115 according to the new desired cruise control speed. In the new parameters step 724, the vehicle controller 218 will monitor vehicle components for environmental parameter changes, or an external load. One such change may be a vehicle road load.

For example, the weather may change the friction coefficient between the road and the vehicle 200. If the environmental parameter of the vehicle have changed, causing the torque required to maintain the vehicle speed to vary, the controller will send a signal to the accelerator pedal assembly 100 to move the pedal limit 115 to the position corresponding to the changing torque requirement to maintain the selected cruise control speed. If neither the environmental parameters have changed, nor the has the driver or the vehicle requested a new speed, the update subroutine 730 will move to the hold position step 712.

Figure 8:
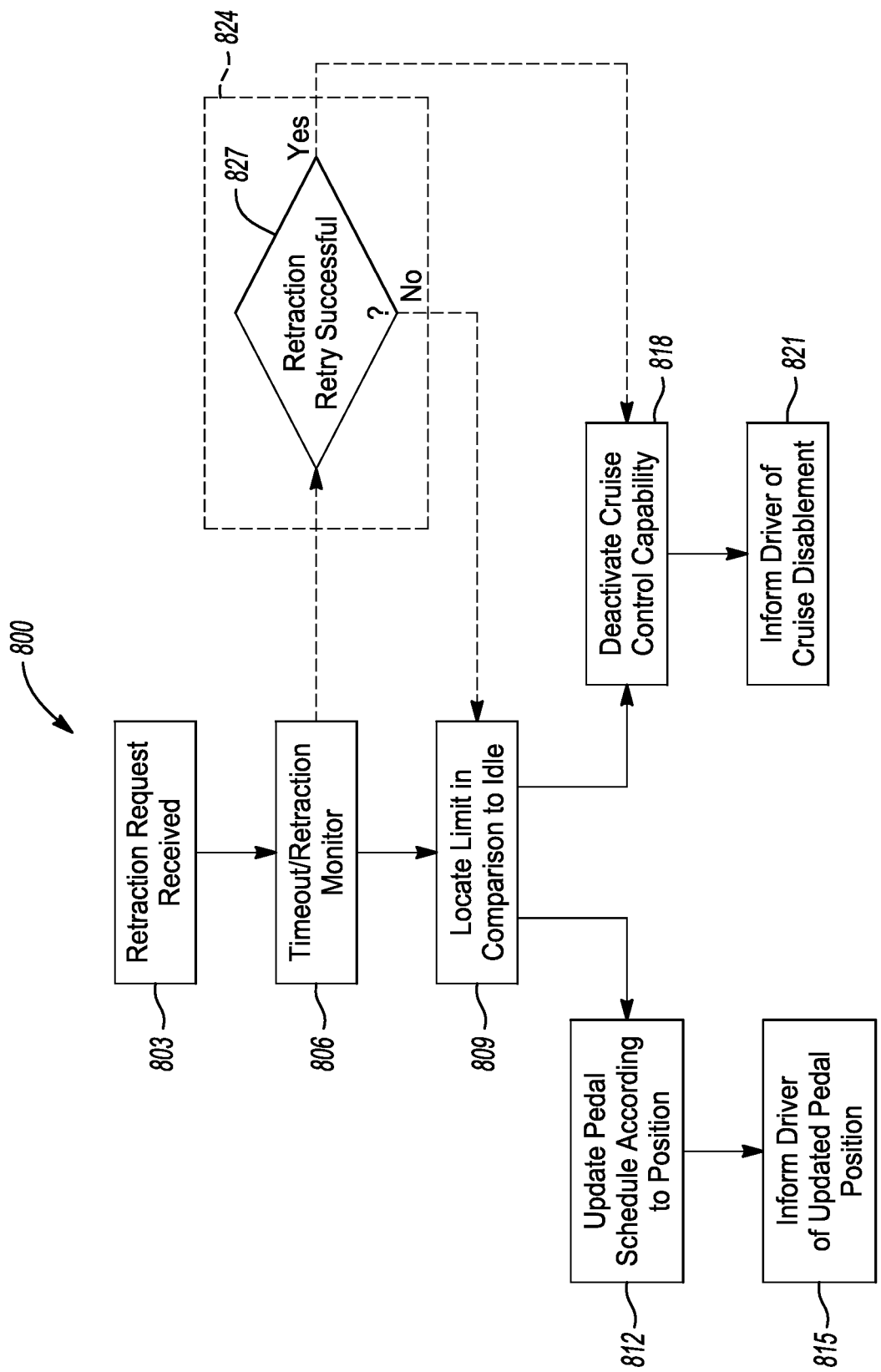
FIG. 8 illustrates a flow chart of a pedal limit release method according to an embodiment.

FIG. 8 depicts a pedal diagnostic method 800. The pedal diagnostic method 800 begins with the vehicle controller 218 receiving a signal indicative of a desire to retract the pedal limit 115 in the retract request step 803, for example, in response to the cruise control being cancelled. The controller may monitor the location of the pedal limit 115 via a sensor associated with the pedal limit 115. For example, the pedal limit 115 may be provided with a Hall-effect sensor, laser measuring distance, or other location or proximity sensor attached to the pedal limit.

In the monitor step 806, if the vehicle controller 218 does not detect that the pedal limit 115 has fully retracted after a predetermined time interval, the vehicle controller 218 determines the accelerator pedal assembly 100 may not be in the desired position and sets a first diagnostic flag. The vehicle controller 218 may further set a first diagnostic flag if the actual position of the pedal limit is more than a predetermined distance from the commanded position for the pedal limit 115 for more than a time threshold, e.g., 1 mm or more from the commanded position for more than one second.

Additionally, or alternatively, the vehicle controller 218 may determine the pedal limit 115 may not have retracted monitoring the parameters of the limit motor 118 attached to the pedal limit 115 and sets a first diagnostic flag.

Once the first diagnostic flag has been set, the controller 218 commands the pedal limit 115 to move to the retracted position.

After setting the first diagnostic flag and commanding the pedal limit 115 to return to the retracted position, the pedal diagnostic method 800 moves to the locate limit step 809, in which the vehicle controller 218 acquires the actual location of the pedal limit 115. If the pedal limit has not returned to the retracted position, the controller sets a second diagnostic flag.

Forward in the update pedal schedule step 812, and in response to the second diagnostic flag being set, the vehicle controller 218 updates the idle position of the accelerator pedal 103, for example, by modifying the pedal map. The controller may reset the idle position for the accelerator pedal as the position of the pedal limit 115, and further may rescale the torque request for a pedal position between the new idle position and the second position of the accelerator pedal.

Next in the first inform driver step 815, the vehicle controller 218 will inform the driver of the change in pedal idle position. For example, the vehicle controller 218 may show an alert on a vehicle dashboard informing the driver of a modified pedal schedule or the new idle position due to the second diagnostic flag being set.

The method 800 additionally or alternatively deactivates the ability of the driver to execute the cruise control feature in the deactivate cruise control step 818. This is followed by a notification to the driver at the second inform step 821, informing the driver of the deactivation of the cruise control feature. The controller 218 may further deactivate the cruise control system in the vehicle to prevent future use when the first and/or second diagnostic flags have been set, and until the first and/or second diagnostic flags have been cleared.

The pedal diagnostic method 800 may further have a retry subroutine 824. In the retry subroutine 824, the vehicle controller 218 may retry to retract the pedal limit 115. If the controller does not detect that the pedal limit 115 has fully retracted, the method 800 may return to the locate limit step 809 and follow the steps mentioned above. Further, the pedal diagnostic method 800 may move to the deactivate cruise control step 818, and continue to follow the deactivate cruise control step 818 and the second inform step 821. Additionally, if the pedal limit 115 is detected as successfully retracting, the pedal diagnostic method 800 may restore the original pedal schedule, but maintain cruise control in a disabled state for the remainder of the drive to avoid recurrence of the pedal limit being out of its commanded position, and also to avoid excessive changing of the pedal schedule.

Various embodiments according to the present disclosure have associated non-limiting advantages. For example, the pedal limit provides motorized feedback to the accelerator pedal based on the throttle position determined by the cruise control. The pedal limit pushes on the accelerator pedal to adjust its position. The pedal limit may include a motor with a worm gear that pushes or moves the pedal to its desired position, and the worm gear may act as a movable stop screw. When user input is provided to the accelerator pedal, the pedal pulls away from the pedal limit and stop screw, permitting acceleration above cruise control's set speed.

If cruise control is enabled and running, the vehicle controller may track the throttle position set by the cruise control. A desired accelerator pedal position may be found by mapping engine and/or traction motor torque onto pedal position to create a pedal map, which is the inverse of the normal process of mapping pedal position to desired engine and/or traction motor torque. The pedal map table may be used with an inverse-lookup to determine desired pedal position. The accelerator pedal is adjusted to the desired position by sending a signal to the pedal limit motor. The location of the pedal limit may be controlled by comparing actual pedal position data against the desired pedal position using a closed or open loop control algorithm in the controller. The actual accelerator pedal position data may be used as feedback data, e.g. by placing the accelerator pedal and pedal limit positions to where the pedal position's mapped torque value is a threshold value or a percentage lower than the prime mover torque value held by cruise control. This threshold value or offset maintains the accelerator pedal in the inactive zone.

The pedal limit may include sensors, such as a Hall-effect or laser device, to determine the location of the pedal limit to confirm the position of the pedal limit, and whether it has retracted. If the pedal limit is unable to retract, the accelerator pedal may be unable to return to the first position. If the desired pedal limit position is more than a predefined distance from the desired position for more than a predetermined time period, then a diagnostic flag may be set and the pedal limit may be commanded to the fully retracted position. If the pedal limit will not fully retract, another diagnostic flag may be set, and the pedal map may be recalibrated to set a new idle position for the accelerator pedal, and the cruise control system may be disabled.

The use of a pedal limit provides an adjustable hard stop against accelerator pedal return to the first position during operation of cruise control and does not inhibit a driver request for additional acceleration during cruise control. By positioning the accelerator pedal to not exceed the pedal position corresponding to engine and/or traction motor torque, the accelerator pedal is positioned within the inactive zone and adjacent to a pedal position associated with the selected cruise control speed, and no unintended throttle data is provided to the controller. As such, the accelerator pedal is positioned by the pedal limit during cruise control operation to be adjacent to or right at the threshold of where higher throttle is introduced by movement of the accelerator pedal, and removes a large sweep of the inactive zone where movement of the accelerator pedal would not affect torque output or driving.

While exemplary embodiments are described above, it is not intended that these embodiments describe all possible forms of the disclosure or invention. Rather, the words used in the specification are words of description rather than limitation, and it is understood that various changes may be made without departing from the spirit and scope of the disclosure. Additionally, the features of various implementing embodiments may be combined to form further embodiments of the invention.

What is claimed is:

1. A vehicle comprising:
    a chassis;
    a prime mover supported by the chassis to propel the vehicle;
    an accelerator pedal supported by the chassis, wherein the accelerator pedal moves in a first direction to request additional torque from the prime mover;
    a pedal limit connected to a motor and movable towards and away from the accelerator pedal, wherein the pedal limit limits movement of the accelerator pedal in the first direction when the pedal limit is in contact with the accelerator pedal; and
    a controller configured to control the motor to move the pedal limit to contact the accelerator pedal in response to receiving an input from a driver to maintain a selected vehicle speed without actuation of the accelerator pedal.

2. The vehicle of claim 1 further comprising a motor drivingly connected to a worm, the worm connected to the pedal limit, wherein the motor translates the worm to move the pedal limit.

3. The vehicle of claim 1 wherein the pedal limit does not inhibit movement of the accelerator pedal in the first direction.

4. The vehicle of claim 1 wherein the accelerator pedal moves away from the pedal limit when the accelerator pedal is moved in the first direction to accelerate the vehicle above the selected vehicle speed.

5. The vehicle of claim 1 wherein the controller is further configured to determine a pedal position as a function of a torque request from the prime mover.

6. The vehicle of claim 5 wherein the controller is further configured to move the pedal limit to contact the accelerator pedal with the accelerator pedal in the pedal position associated with the torque request for the selected vehicle speed.

7. The vehicle of claim 5 wherein the pedal limit is positioned to correspond with a threshold value below the torque request for the selected vehicle speed.

8. A method of controlling a vehicle, the method comprising:
    receiving a request from a driver to operate a vehicle in cruise control at a selected vehicle speed;
    controlling a prime mover to propel the vehicle at the selected vehicle speed without actuation of an accelerator pedal; and actuating a pedal limit towards the accelerator pedal to establish contact with the accelerator pedal and maintain the accelerator pedal in a position associated with the selected vehicle speed and limit movement of the accelerator pedal towards an idle position while the vehicle is operating in cruise control.

9. The method of claim 8 further comprising retracting the pedal limit away from the accelerator pedal such that the pedal limit no longer contacts the accelerator pedal in response to receiving another request from the driver to cancel operation of the vehicle in cruise control.

10. The method of claim 8 wherein the pedal limit does not inhibit movement of the accelerator pedal in a first direction indicative of a request for additional torque while the vehicle is operating in cruise control.

11. The method of claim 8 wherein the position of the pedal is determined using a drivetrain torque required to meet the selected vehicle speed.

12. The method of claim 8 further comprising moving the pedal limit to a second position while the vehicle is operating in cruise control in response to a request from the driver to alter the selected vehicle speed without actuating the accelerator pedal.

13. The method of claim 8 further comprising moving the pedal limit to a second position while the vehicle is operating in cruise control in response to a change in an external load on the vehicle.

14. The method of claim 8 wherein the position of the accelerator pedal indicates a torque request that is a threshold value below a torque of the prime mover required to meet the selected vehicle speed.

15. The method of claim 8 further comprising measuring the position of the pedal limit using a sensor.

16. The method of claim 15 further comprising commanding the pedal limit to retract away from the accelerator pedal if a measured position of the pedal limit differs from the position associated with the selected vehicle speed across a time interval.

17. The method of claim 15 further comprising setting the measured position of the accelerator pedal as the idle position for the prime mover if the measured position of the pedal limit differs from the position associated with the selected vehicle speed across a time interval.

18. The method of claim 17 further comprising disabling cruise control for selection by the driver and disabling actuation of the pedal limit in response to setting the measured position of the accelerator pedal as the idle position for the prime mover.

19. An accelerator pedal system for a vehicle, the system comprising:
an accelerator pedal movable in a first direction to request additional torque from a prime mover;
a spring biasing the accelerator pedal in a second direction opposite to the first direction;
a pedal limit connected to a motor and movable towards and away from the accelerator pedal, wherein the pedal limit limits movement of the accelerator pedal in the first direction when the pedal limit is in contact with the accelerator pedal; and
a controller configured to control the motor to move the pedal limit to a first position in contact with the accelerator pedal in response to receiving a cruise control input from a driver to maintain a selected vehicle speed without actuation of the accelerator pedal.

20. The system of claim 19 wherein the controller is further configured to determine a position of the accelerator pedal using a prime mover torque required to meet the selected vehicle speed, and control the motor to move the pedal limit to a second position while the vehicle is operating in cruise control in response to a request from the driver to alter the selected vehicle speed without actuation of the accelerator pedal thereby adjusting a range of motion of the accelerator pedal.

* * * * *